United States Patent [19]

Kuhlen et al.

[11] Patent Number: 4,670,660
[45] Date of Patent: Jun. 2, 1987

[54] OPTICAL LIQUID LEVEL INDICATOR AND METHOD

[75] Inventors: Harry J. Kuhlen, West Chester, Pa.; Paul H. Nielsen, Wilmington, Del.

[73] Assignee: Aeroquip Corporation, Jackson, Mich.

[21] Appl. No.: 720,025

[22] Filed: Apr. 4, 1985

[51] Int. Cl.⁴ .............................................. G01F 23/02
[52] U.S. Cl. ...................................... 250/577; 73/327
[58] Field of Search ............. 250/577; 73/290 R, 293, 73/323, 324, 325, 326, 327, 328, 329, 330, 331, 332, 333, 334; 356/70

[56] References Cited

U.S. PATENT DOCUMENTS

| | | | |
|---|---|---|---|
| 3,345,870 | 10/1967 | Yoshinaga | 73/327 |
| 3,435,681 | 4/1969 | Stanley | 73/331 |
| 3,570,311 | 3/1969 | Nelson | 73/327 |
| 3,796,098 | 3/1974 | Trayer | 73/327 |
| 3,893,339 | 7/1975 | Melone | 73/327 |
| 4,201,086 | 5/1980 | Jones | 73/327 |

Primary Examiner—Eugene R. LaRoche
Assistant Examiner—David Mis
Attorney, Agent, or Firm—Anthony Potts, Jr.; Robert S. Lipton; Robert B. Famiglio

[57] ABSTRACT

An optical liquid level sensor utilizing both a prismatic member for the light refraction when immersed in and surrounded by a liquid and its effects for the indication of the presence and absence, selectively, of the liquid level. This level indication is provided in the subject case through a target plate bearing letter codes and legends, respectively, which are recognized and standardized in this trade and which become visible at the onset and for the duration of an acceptable liquid level situation; otherwise; a messageless image appears in the sensor. The illuminated target plate allows also for the observation of the color and any color change of the liquid and the taking of remedial actions.

6 Claims, 10 Drawing Figures

OPTICAL LIQUID LEVEL INDICATOR AND METHOD

BACKGROUND

The principles of total reflection and refraction have been used rather frequently individually and jointly in various optical instruments. Several of these devices were developed and applied for the sensing of levels of liquids and to indicate the absence and the presence, respectively, of a liquid in a hydraulic system with respect to a predetermined level. The indication was obtained through visual observation, auxiliary electric transceiver circuits, or any combinations thereof. The indications were provided by means of light vs. dark signal areas, displays of contrasting colors, and other comparable, traditional arrangements. As the complexity of the to be monitored systems increased, those fairly primitive, traditional indicators no longer present a specific information. For example, a green light, usually standing for a clear condition, did not signify as to whether the sensor's condition or that of the liquid system was all right. Even more uncertain was a sensing device which displayed a signal in case of a danger, but no signal when conditions were safe; obviously, no signal could have also been the result of a defective signal circuit thereby precluding corrective action for the monitored liquid system.

Monitoring equipment of the aforementioned general characteristics has been shown and described in various publications which include, but may not be limited to the following references:

Nicholas P. Chironis: MACHINE DEVICES AND INSTRUMENTATION; McGraw-Hill Book Company, New York, 1966, Library of Congress Catalog Card Number 66-18474; Aspect Sensor, p. 283; Oil level detector, p. 335.

Periodical "CONTROL ENGINEERING", August 1974: Product data on "LIQUID SENSOR" of Genelco, Inc., Dallas, TX.

The devices covered by the listed references contain the undesirable features which this invention intends to overcome in accordance with the following equipment description.

SUMMARY OF INVENTION

This invention includes a target plate of say, a circular shape mounted adjacent to and concentrically with the, for example, conical top of a prism. Said target plate is provided on the surface facing the apex of the aforementioned conical top with, in this case, the letters "OK", the colloquial endorsement of acceptable conditions. These letters are applied in any of white, silver, or another highly visible, possibly light-reflecting color on a dark background which, in turn, is applied to that surface of the target plate. Obviously, a reversed color scheme, namely, dark-colored letters applied on a light-colored background may be chosen to suit other requirements or preferences.

In the absence of, for example, oil or when the oil level is below both the apex of the conical prism top and target plate adjacent to it, the user/observer sees a bright, messageless, reflecting surface when that end of the prism opposite to the end having the conical top is illuminated, through natural or artificial light, as it is operated in the present system configuration. However, when oil occupies the gap and space between the target plate and the conical prism top, the user/observer sees the imprinted letters "OK" clearly, instead of just a dark circular area as is only available in presently existing devices of this kind. Thusly, a positive and self-explanatory indication of both the presence of oil and of a satisfactory oil level is provided.

In addition thereto, this invention also furnishes a signal for the need of an oil change as dirty oil will still allow for the reading of the letters but with distinctly more difficulty and at a different color hue.

The liquid level sensor in accordance with this invention operates under normal exterior light conditions as well as when illuminated with a conventional flashlight. Although a permanently installed light source can be used for the emission of the operational light rays, its mounting together with that of the wiring and a switch would require additional cost for materials and assembly labor without rendering an improved performance Further advantages of the subject invention per se and over prior art will become more apparent from the following description and the accompanying drawing.

In the drawing, forming a part of this application:

Figure 4:
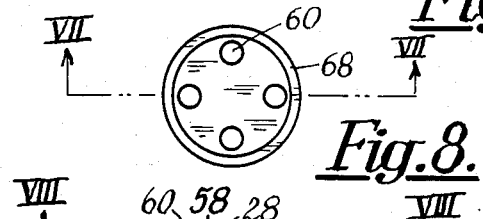
Figure 5:
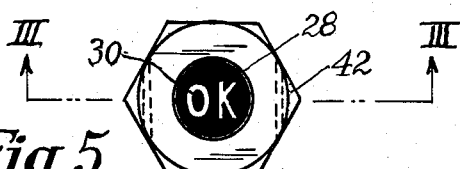
Figure 6:
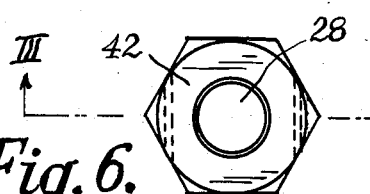

FIG. 4 presents a plan view of the housing bottom inside when viewed in the direction of section IV—IV;

FIG. 5 portrays the image on the target plate with its legend visible when both the prism top and the target plate are covered with a liquid and when viewed in the direction of IV—IV;

FIG. 6 shows the image on the target plate void of a legend when the liquid is absent or at any unsafe level below the prism top as viewed in the direction of IV—IV.

Figure 8:
Figure 7:
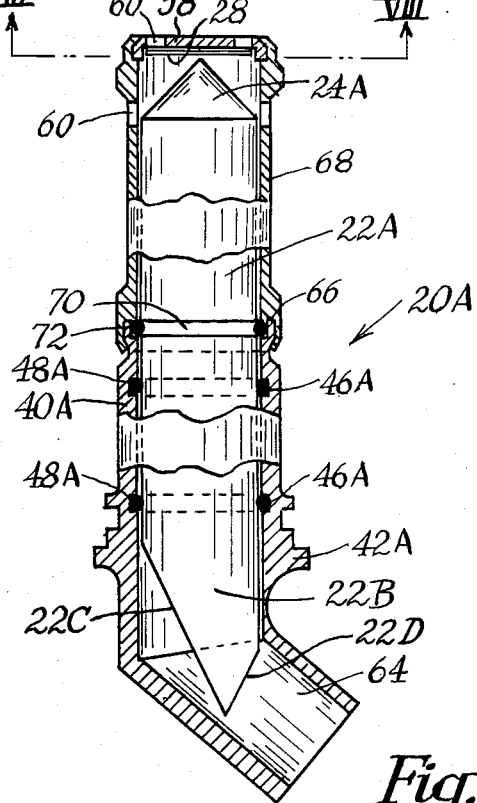
Figure 9:
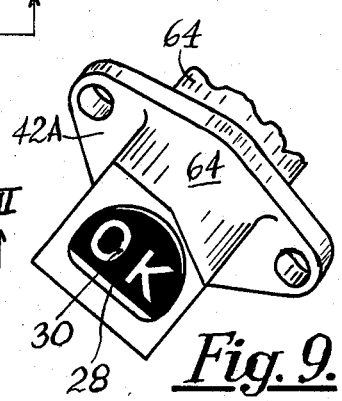
Figure 10:
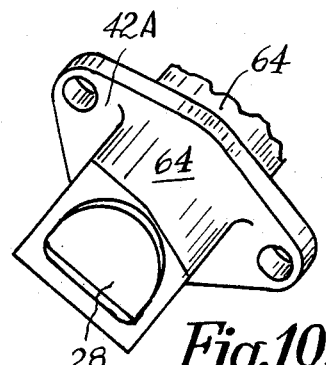

FIG. 7 illustrates in front elevation and cross-section in the plane VII—VII a subject liquid-level sensor assembly for directional viewing precluding erroneous or incorrect liquid level readings;

FIG. 8 presents a plan view of the housing end when viewed in the direction VIII—VIII;

FIG. 9 shows in isometric projection the mounting flange of the liquid-level sensor assembly in accordance with FIG. 7 and the legend on the target plate indicating the presence of a liquid above the conical prism top and safe operating conditions and FIG. 10 is an isometric view of the mounting flange of the liquid-level sensor illustrated in FIG. 7 showing a target plate void of any legend indicating the absence of liquid or at an unsafe level with respect to the target plate.

DETAILED DESCRIPTION

Figure 1:
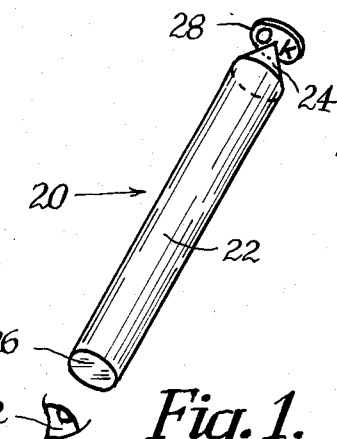
FIG. 1 is a simplified, isometric view of the prism, its conical top and the target plate constituting the principal component parts of the subject liquid level sensor.

Referring now to the drawing, wherein like reference numerals designate like or corresponding parts and, more particularly, to FIG. 1, depicting the principle of the subject indicating prism level sensor assembly 20, a prism 22 of, say, pyrex, having a conical end 24 and a flat end 26 and a flat circular plate 28 positioned concentrically and axially with but perpendicularly to the axis of said cylindrical prism 22, facing with one of its two surfaces the apex of said conical top 24 across a small gap. A legend 30, for example, the letters "OK" is imprinted on said plate surface.

Assuming a liquid exists so as to surround the conical prism top 24 and said plate 28, the letters "OK" will be visible for an observer (eye) 32, instead of just a dark field seen in previous sensors, whereas an absence of liquid or a liquid level from said plate 28 will render a clear, bright, reflecting surface as plate image, indicating an unsafe operating condition, requiring service.

The light rays producing the aforementioned sensor functions are those available from any ambient light source, or from portable appliances, such as flashlights or so-called trouble lights.

Figure 2:
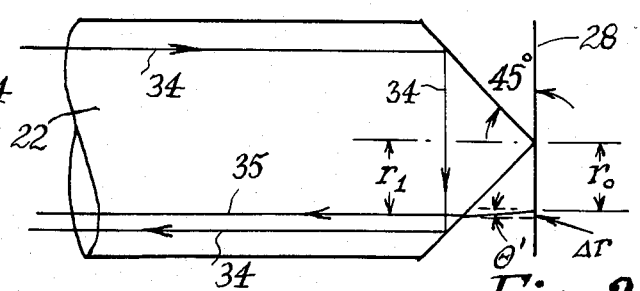
FIG. 2 shows the geometry involved in the optical relations of the basic liquid level sensor assembly.

It may be in order to present the following brief treatise on the theory of the subject sensor operation as shown in FIG. 2.

A ray of light 34 travelling inside the prism 22 and parallel to the axis of the prism inside, will be totally internally reflected when it strikes the 45° conical end, in the absence of oil. The relevant equation is Shell's law of refraction:

$$n_1 \sin \theta_1 = n_2 \sin \theta_2$$

where $n_1$ is the index of refraction of the prism, $n_2$ is the index of the medium outside the prism, $\theta_1$ is the angle that the ray in the prism makes to the surface normal, $\theta_2$ is the angle that the emerging ray makes to the surface normal. The index of refraction of the pyrex prism is 1.49. Sin 45° = 0.7071, and the product $n_1 \sin \theta_1 = 1.054$. If $n_2 = 1$ (for air), there is no $\theta_2$ that will satisfy this equation, hence total internal reflection occurs.

However, when the outside medium is oil (not shown), with a typical index of 1.45, $\theta_2 = 46.60°$, and the light is bent by 1.6° toward the axis of the prism as shown for the ray 35. This deflection has a small effect on the aparent size of the image of the pattern. If $r_o$ is the apparent radius, the geometry of FIG. 2 shows that the ratio $$r_o/r_1 = 1 - \tan \theta'$$

and with $\theta' = 1.6°$, $r_o/r_1 = 0.972$. This is almost inconsequential.

Hence, in the absence of oil, the total internal reflection produces a bright featureless plate of light reflected by the conical prism. When oil fills the gap, there is almost no refraction at the end of the prism and the observer sees the target plate pattern, with the size very slightly modified by refraction. As the oil becomes opaque from usage and suspended solids, the pattern will become more and more obscure, indicating the need of service.

Research, development and laboratory experiments provided the following application details and considerations assuming oil as the liquid under discussion:

(a) Because of the close match of the oil and glass indexes of refraction, the surface finish on the prism cones is not as critical as it might otherwise be. The present slightly rippled, but polished surface, appears to be adequate.

(b) If an internal planar reflection occurs in the prism, to permit a different viewing angle, the target lettering must be a mirror image of the letters that the observer is expected to read, and the target plate must be correctly oriented so that the mirror plane of the letters coincides with the minor plane in the prism.

(c) It is also important to consider the size of the letters. To make them easy to see, the overall dimensions of the space occupied by letters should be significantly less than the prism diameter. A maximum dimension of about 0.4 to 0.5 of the prism diameter seemed best in initial trials.

(d) The design of the mounting of the plate 28 must be carefully considered, so that air can easily escape as oil fills the gap, and so that, conversely, all oil will drain out of the gap between the target and the prism end to prevent erroneous disk observations. The respective design details appear in the related assembly descriptions.

Based on the foregoing background data and results, a typical embodiment of the subject liquid level sensor is shown in FIGS. 3, 4, 5 and 6 and described jointly as follows.

Figure 3:
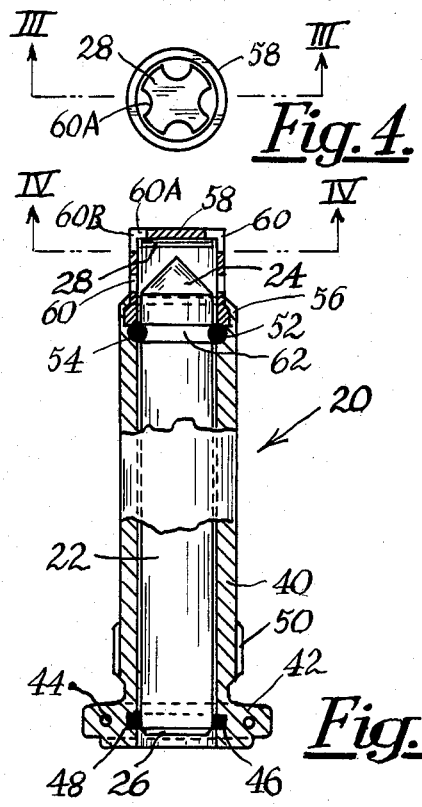
FIG. 3 illustrates in front elevation and cross-section in the plane III—III a subject liquid level sensor assembly for generally accessible viewing.

The sensor assembly 20 shown in FIG. 3 consists of a vertically positioned cylindrical tubing 40 having an external flange 42 with safety wiring provisions 44 at one end and an internal annular groove 46 formed in its interior near its other end adapted to receive an "O"-ring 48.

An external thread 50 is formed at the outside of the cylindrical tubing 40 extending axially from below the flange 42 for a suitable distance.

An internal annular groove 52, comparable to the groove 46, is formed near the other end in the cylindrical tubing 40, and adapted, likewise, to receive an "O"-ring 54. The remaining portion 56 of the cylindrical tubing 40 beyond said "O"-ring 54 is counterbored and adapted to receive a cup-shaped member 58 installed within said counterbored portion in said tubing through crimping or equivalent methods, having a plurality of holes 60 formed in its side wall and near its bottom so that of the latter, a part of the hole 60A is located in the bottom of said cup-shaped member 58 and the other part 60B in the lateral wall of said cup-shaped member 58, allowing for the exchange of liquid and air as described in the foregoing. A possible construction is to use a tube with large side cutouts for supporting the target. The side cutouts permit oil to enter and air to escape. The target plate edges may be scalloped in four to six spaces so that when mounted at the end of the supporting tube (probably by spinning into the end) there will remain gaps between the tube walls and the edge of the target plate where air can escape. The target plate should be positioned about 0.06 inch from the end of the prism to allow for differential thermal expansion, and mechanical tolerances, and still leave a gap large enough that the oil will drain out of the gap.

The speedy level indication provided by the holes 60 allowing for the expeditious liquid filling and voiding, respectively, of the space about the conical prism end 24 is extremely important. A delay of this signal may either impart the message that, say, oil is present while it is not, or, that no oil is at hand, thereby inviting a refill resulting in extremely hazardous overfilling.

A, for example, cylindrical prism 22 having one conically-shaped end 24, one flat end face 26 and one annular groove 62 formed in it near said conical end 24 is placed within said cylindrical tubing 40 and positioned therein through its engagement between said "0"-ring 54 and its annular groove 62 in such a manner that the apex of said conical end 24 is at a distance of 0.060 inch from the bottom inside of said cup-shaped member 58 for reasons explained in the foregoing. The other, flat-faced end 26 of the prism 22 is lodged between the "0"-ring 48, terminating somewhat inside of the face of the flange 48 and exposing its flat face 26 to the outside of the sensor assembly 20.

A target plate is placed fixedly inside of said cup-shaped member 58. A suitable legend 64, in this example, the expression "OK" is affixed upon the surface of the target plate 28 which faces the apex of the conical prism 24. The legend may be provided, for example, with silver color characters on a dark, i.e., black background, either or both having light-reflecting properties, or not, or with symbols or numbers, or any combination thereof as to the meaning or the color code of the respective legend.

The entire aforedescribed liquid level sensor assembly 20 is mounted on a vessel flange (not shown) mating with the external flange 42 and a thread (not shown) matching the thread 50 of the sensor, whereby the conical end 24 of the prism 22 is surrounded by the to be monitored liquid, such as engine oil. In this condition, shown in FIG. 5, the legend "OK" becomes visible as the flat face 26 of the prism 22 is exposed to light and so viewed. If and as soon as the level of the liquid clears the apex of the conical prism end 24, the blank image shown in FIG. 6 appears, which is also the case when the liquid has become lost or was never present.

When viewing the target plate it is important to center the axis of observation; otherwise various rays may render meaning less or, worse yet, confusing target plate information.

Partly to prevent several, or all, of the aforementioned possible failure modes and partly to furnish a more professional unit, the sensor assembly 20A was developed, as shown in FIGS. 7, 8, 9 and 10, but operating on the same principles as the sensor assembly 20.

In this case, the substantially cylindrical tubing 40A has an angular, likewise cylindrical, extension 64 at its viewing end so as to force the viewer to orient his observation in the proper direction. An external flange 42 and several other, auxiliary shapes are formed on said cylindrical tubing 40A on the straight portion, beyond the angular extension 64. At least one internal annular groove 46A is also formed in said cylindrical tubing 40A to be occupied by an "0"-ring 48A. The outside diameter of the cylindrical tubing 40A is reduced so as to accommodate the offset top 66 of a cup-shaped cylindrical sleeve 68, having a cap 58A, surrounding the reduced diameter portion of the tubing 40A.

A prism 22A of, however, a somewhat specialized shape of its portion 22B at the viewing end is lodged within the cylindrical tubing 40; an annular groove 70 is formed radially on the cylinder surface and at an axial location coinciding with the aforementioned reduced outsider diameter position, to receive an "0"-ring 72. The aforementioned three "0"-rings are compressed upon the insertion of the prism 22A securing the prism 22A within the assembly.

Although the prism 22A, 22B will perform its function as shown and described in the foregoing, its optical efficiency can be enhanced if, for example, its face 22C is covered with a protective coating of, say, aluminum and silicon dioxide (Al +SiO$_2$) and the prism face 22D is coated with, say, magnesium difluoride (MgF$_2$) having anti-reflection properties.

The cup-shaped sleeve 68 with its cap 58A is placed over conical prism end 24A so as to leave a gap of, approximately, 0.060 inch between the apex of the conical prism end and the inside of the cap 58A and fastened over and to the cylindrical tubing 40A through crimping or equivalent methods over the reduced-diameter portion of said cylindrical tubing 40A. Like in the previous unit, a plurality of holes 60 is formed in its side wall and near its bottom with the identical oil and air drainage and refill feature arrangement.

The target plate 28 is provided, located and installed like in the unit shown in FIGS. 3, 4, 5 and 6 and is furnished with the identical or comparable legends, colors and other characteristics or identical combinations and choices thereof.

Commensurate with the more elaborate style of the unit shown in FIGS. 7, 8, 9 and 10, the eye piece portion and viewing face is formed as illustrated in the top views of FIGS. 9 and 10, without affecting the performance, operation, and application and their respective descriptions of those properties for the preceding unit.

It may be in order to re-emphasize that the herein presented liquid level sensors are self-sufficient units, utilizing ambient light or that available from simple portable sources, such as flashlights, for their operation, obviating any costly and complex electrical support systems together with their own failure probabilities.

It should further be noted that prisms having shapes varying from those shown and described in the foregoing can readily be employed for the intended sensing purposes, so long as each such prism has a flat surface at one of its two ends and a sharp-cornered, such as a conical or pyramidal termination at its other end.

It is understood that the herein shown and described embodiments of the subject invention are but illustrative and that variations, modifications and alterations are feasible within the spirit of these teachings.

What is claimed is:

1. An optical apparatus for indicating liquid level in a vessel which comprises:
   (a) an enclosure having mounting provisions for the installation on a vessel capable of containing a liquid, a plurality of drainage holes formed in the enclosure exposed to the liquid and a plurality of annular grooves formed radially in its interior;
   (b) a respective toroidal, leakproof packing member lodged within each of said annular grooves;
   (c) an optical prism having one conical end and another end having at least one flat surface, lodged within said packing members in said enclosure with its conical end in a direction of and for exposure to the liquid and its end having at least one flat surface exposed to the outside of said vessel and the prevailing natural or artificial light and accessible for viewing by an observer;
   (d) a target plate positioned within the enclosure at the end facing the liquid and perpendiculary with respect to the axis of said prism facing the apex of the conical end of said prism at a gap allowing for the thermal expansion differential tolerances among the said component parts; and
   (e) a descriptive legend provided on the surface of said target plate facing the apex of the conical end of said prism and appearing visible to an observer looking into said prism at its end having at least one flat surface when the target plate is covered with a liquid, but exhibiting a bright, blank plate image in the absence of a liquid, thereby signalling danger and the requirement for attention and servicing, respectively.

2. An optical liquid level apparatus as defined in claim 1 wherein said descriptive legend is formed by the characters "OK".

3. An optical liquid level apparatus as defined in claims 1 or 2, wherein said descriptive legend is applied to said target plate in a highly visible, light-reflecting color on a background of a light-absorbing dark color.

4. An optical liquid level as defined in claim 1 or 2, wherein said descriptive legend is applied to said target plate surface in a dark, light-absorbing color on a background of a highly visible, light-reflecting color.

5. An optical liquid level aparatus as defined in claim 1 wherein said plurality of drainage holes is located in the proximity of both said target plate and said conical prism end to assure the apparatus's rapid filling with and voiding of the to be determined liquid together with air exchanges, for dependable liquid level observations.

6. An optical liquid level apparatus as defined in claim 1, wherein said flat surface is coated with a substance to protect the flat surface and with a substance having anti-reflection properties whereby optical efficiency of said apparatus is enhanced.

* * * * *

UNITED STATES PATENT AND TRADEMARK OFFICE
CERTIFICATE OF CORRECTION

PATENT NO. : 4,670,660

DATED : June 2, 1987

INVENTOR(S) : Harry J. Kuhlen and Paul H. Nielsen

It is certified that error appears in the above-identified patent and that said Letters Patent are hereby corrected as shown below:

Column 7, line 5, that portion of the Claim reading "level as defined" should read ---level apparatus as defined---.

Column 7, line 9, "aparatus" should read ---apparatus---.

Column 8, line 2, "apparatus's" should read ---apparatus'---.

Signed and Sealed this

Seventeenth Day of November, 1987

Attest:

DONALD J. QUIGG

*Attesting Officer*  *Commissioner of Patents and Trademarks*